US012652653B2

(12) United States Patent
Zhang et al.

(10) Patent No.: US 12,652,653 B2
(45) Date of Patent: Jun. 9, 2026

(54) MULTIPLEXED TRANSMISSION OF UPLINK CONTROL INFORMATION WITH DIFFERENT PRIORITIES

(71) Applicant: GUANGDONG OPPO MOBILE TELECOMMUNICATIONS CORP., LTD., Dongguan (CN)

(72) Inventors: Yi Zhang, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 320 days.

(21) Appl. No.: 18/505,425

(22) Filed: Nov. 9, 2023

(65) Prior Publication Data

US 2024/0089928 A1 Mar. 14, 2024

Related U.S. Application Data

(63) Continuation of application No. PCT/CN2021/092907, filed on May 10, 2021.

(51) Int. Cl.
*H04W 72/04* (2023.01)

(52) U.S. Cl.
CPC .................................. *H04W 72/04* (2013.01)

(58) Field of Classification Search
CPC ... H04W 72/04; H04W 72/11; H04W 72/115; H04W 72/40; H04W 72/12; H04W 16/00; H04W 36/00; H04B 7/024; H04L 1/0001;

H04L 1/0041; H04L 1/0031; H04L 1/007; H04L 1/0073; H04L 1/1671; H04L 1/0067; H04L 5/00; H04L 2001/0098
See application file for complete search history.

(56) References Cited

U.S. PATENT DOCUMENTS

| | | | |
|---|---|---|---|
| 2015/0009926 A1 | 1/2015 | Seo et al. | |
| 2018/0220413 A1 | 8/2018 | Yang et al. | |
| 2020/0163081 A1* | 5/2020 | Kim ..................... | H04L 5/0053 |

FOREIGN PATENT DOCUMENTS

| | | |
|---|---|---|
| CN | 110535570 | 12/2019 |
| CN | 112005577 | 11/2020 |
| EP | 3734922 | 11/2020 |

(Continued)

OTHER PUBLICATIONS

WIPO, International Search Report and Written Opinion for PCT/CN2021/092907, Jan. 26, 2022.

(Continued)

*Primary Examiner* — Brian T Le
(74) *Attorney, Agent, or Firm* — Hodgson Russ LLP

(57) ABSTRACT

The present application discloses an information processing method and apparatus, a terminal device, and a storage medium. The method includes: based on a first bit length and/or a second bit length, determining a first rate matching output sequence length corresponding to first information. The first bit length is determined according in the number of bits of the first information and a code rate corresponding to the first information, and the second bit length is determined according to the number of bits of second information and a code rate corresponding to the second information, and the first information and the second information are transmitted on the same physical channel.

14 Claims, 2 Drawing Sheets

(56)           References Cited

FOREIGN PATENT DOCUMENTS

| | | |
|---|---|---|
| EP | 3979538 | 4/2022 |
| WO | 2017028038 | 2/2017 |
| WO | 2019098697 | 5/2019 |
| WO | 2021003724 | 1/2021 |
| WO | 2021041380 | 3/2021 |

OTHER PUBLICATIONS

Oppo, "Enhancements on intra-UE multiplexing/prioritization," 3GPP TSG RAN WG1 #104b-e, R1-2102395, Apr. 2021.
Apple Inc., "Views on Intra-UE Multiplexing/Prioritization," 3GPP TSG-RAN WG1 Meeting #104b-e, R1-2103106, Apr. 2021.
Oppo, "Summary#1 of email thread [104b-e-NR-R17-IIoT_URLLC-04]," 3GPP TSG RAN WG1 #104b-e, R1-2103868, Apr. 2021.
"3rd Generation Partnership Project; Technical Specification Group Radio Access Network; NR; Multiplexing and channel coding (Release 16)," 3GPP TS 38.212, Mar. 2021, v16.5.0.
EPO, Extended European Search Report for EP Application No. 21941217.8, May 3, 2024.

* cited by examiner

Based on a first bit length and/or a second bit length, determine a first rate matching output sequence length corresponding to first information — 202

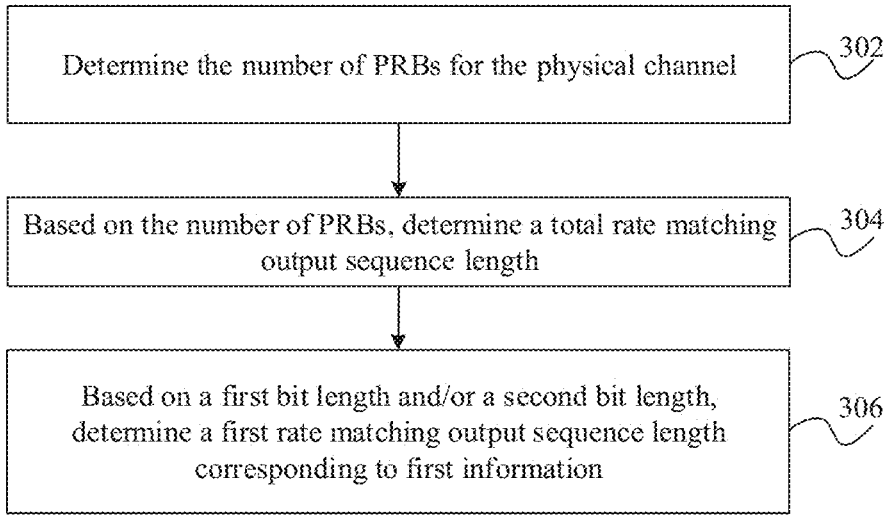

Determine the number of PRBs for the physical channel — 302

Based on the number of PRBs, determine a total rate matching output sequence length — 304

Based on a first bit length and/or a second bit length, determine a first rate matching output sequence length corresponding to first information — 306

FIG. 3

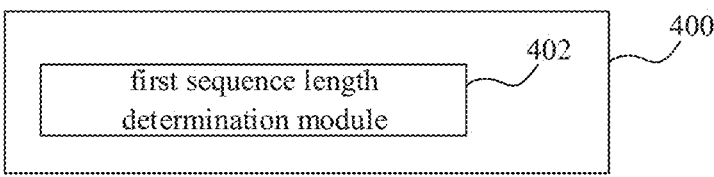

first sequence length determination module — 402

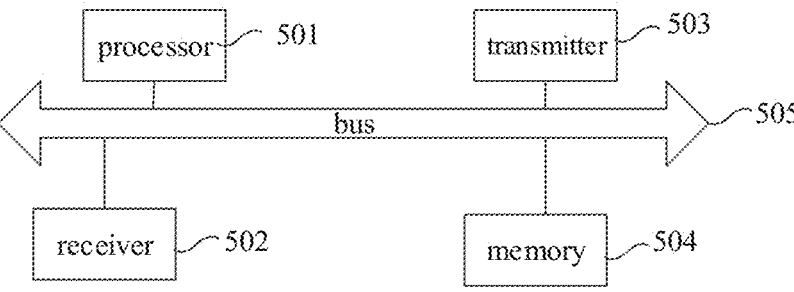

processor — 501          transmitter — 503 bus — 505 receiver — 502          memory — 504

FIG. 5

MULTIPLEXED TRANSMISSION OF UPLINK CONTROL INFORMATION WITH DIFFERENT PRIORITIES

CROSS-REFERENCE TO RELATED APPLICATIONS

This application is a continuation of International Application No. PCT/CN2021/092907, filed May 10, 2021, the entire disclosure of which is incorporated herein by reference.

TECHNICAL FIELD

Embodiments of the present disclosure relate to the communication technical field, and more specifically, to an information processing method and apparatus, a terminal device and a storage medium.

BACKGROUND

In New Radio (NR) R16, in order to better support Ultra-Reliable Low Latency Communication (URLLC) services, the physical layer introduces high and low priorities for uplink channels to differentiate the priority of uplink control information.

As to how to realize multiplexed transmission of uplink control information with different priorities, related art has not yet provided a good solution.

SUMMARY

Embodiments of the present disclosure provide an information processing method and apparatus, a terminal device, and a storage medium. Technical solutions are as follows:

According to an aspect of embodiments of the present disclosure, there is provided an information processing method. The method is performed by a terminal device. The method includes: based on a first bit length and/or a second bit length, determining a first rate matching output sequence length corresponding to first information;

wherein the first bit length is determined according to the number of bits of the first information and a code rate corresponding to the first information, and the second bit length is determined according to the number of bits of second information and a code rate corresponding to the second information, and the first information and the second information are transmitted on the same physical channel.

According to an aspect of embodiments of the present disclosure, there is provided an information processing apparatus. The apparatus includes: a first sequence length determination module;

wherein the first sequence length determination module is configured to, based on a first bit length and/or a second bit length, determine a first rate matching output sequence length corresponding to first information;

wherein the first bit length is determined according to the number of bits of the first information and a code rate corresponding to the first information, and the second bit length is determined according to the number of bits of second information and a code rate corresponding to the second information, and the first information and the second information are transmitted on the same physical channel.

According to an aspect of embodiments of the present disclosure, there is provided a terminal device. The terminal device includes a processor;

wherein the processor is configured to, based on a first bit length and/or a second bit length, determine a first rate matching output sequence length corresponding to first information;

wherein the first bit length is determined according to the number of bits of the first information and a code rate corresponding to the first information, and the second bit length is determined according to the number of bits of second information and a code rate corresponding to the second information, and the first information and the second information are transmitted on the same physical channel.

According to an aspect of embodiments of the present disclosure, there is provided a computer-readable storage medium, wherein a computer program is stored in the storage medium, and the computer program is used to be executed by a processor to implement the information processing method at the terminal device side.

According to an aspect of embodiments of the present disclosure, there is provided a chip. The chip includes a programmable logic circuit and/or program instructions, configured to implement the information processing method at the terminal device side when the chip is run.

According to an aspect of embodiments of the present disclosure, there is provided a computer program product or computer program. The computer program product or computer program includes computer instructions, and the computer instructions are stored in a computer-readable storage medium. A processor reads from the computer-readable storage medium the computer instructions and executes the computer instructions, so as to implement the information processing method at the terminal device side.

The technical solutions provided in the embodiments of the present disclosure can bring the following beneficial effects:

An implementation of information multiplexing transmission is provided. Different information (for example, first information and second information) being transmitted on the same physical channel is supported. In this case, based on the first bit length and/or the second bit length, the first rate matching output sequence length corresponding to the first information can be determined. Since the first bit length is determined according to the number of bits of the first information and the code rate corresponding to the first information and the second bit length is determined according to the number of bits of the second information and the code rate corresponding to the second information, the determination of the first rate matching output sequence length takes into account the relevant parameter of the first information and/or the relevant parameter of the second information, which is conducive to determining a reasonable first rate matching output sequence length, thereby guaranteeing the transmission of the first information.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

FIG. 3 is a flowchart of an information processing method provided by an embodiment of the present disclosure;

FIG. 4 is a block diagram of an information processing apparatus provided by an embodiment of the present disclosure;

FIG. 5 is a structural schematic diagram of a terminal device provided by an embodiment of the present disclosure.

DETAILED DESCRIPTION

Figures 1, 2:
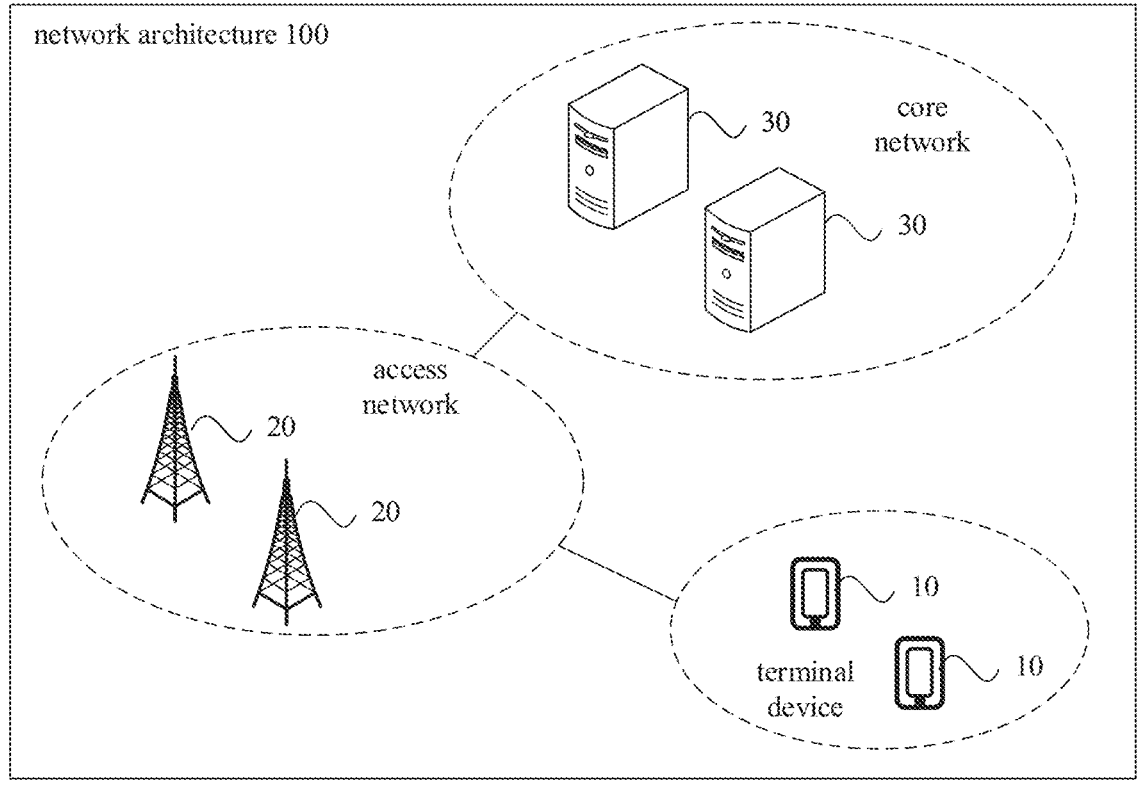
FIG. 1 is a communication system provided by an embodiment of the present disclosure.
FIG. 2 is a flowchart of an information processing method provided by an embodiment of the present disclosure.

In order to make the purposes, technical solutions and advantages of the present disclosure clearer, the implementations of the present disclosure will be further described in detail below with reference to the accompanying drawings.

The network architecture and service scenarios described in the embodiments of the present disclosure are for more clearly illustrating the technical solutions of the embodiments of the present disclosure, and do not constitute limitations on the technical solutions provided by the embodiments of the present disclosure. Those skilled in this art will understand that, as the evolution of the network architecture and the emergence of new service scenarios, the technical solutions provided in the embodiments of the present disclosure are also applicable to similar technical problems.

FIG. 1 shows a block diagram of a communication system provided by an example embodiment of the present disclosure. The communication system 100 may include: a terminal device 10, a access network device 20 and a network device 30.

The terminal device 10 may refer to a UE (User Equipment), an access terminal, a user unit, a user station, a mobile station, a mobile terminal, a remote station, a remote terminal, a mobile device, a wireless communication device, a user agent, or a user device. Optionally, the terminal device 10 may also be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, a vehicle-mounted device, a wearable device, a terminal device in 5GS (5th Generation System, fifth-generation mobile communication system) or a terminal device in a future evolved Public Land Mobile Network (PLMN), etc., and embodiments of the present disclosure do not impose specific limitations on this. For convenience of description, the devices mentioned above are collectively referred to as a terminal device. Generally, there may be multiple terminal devices 10, and one or more terminal devices 10 may be distributed in a cell managed by each access network device 20.

The access network device 20 is a device deployed in an access network to provide a wireless communication function for a terminal device 10. The access network device 20 may include various forms of macro base stations, micro base stations, relay stations, access points, and so on. In systems using different radio access technologies, the name of the device with access network device functions may be different. For example, in a 5G NR system, such device is called gNodeB or gNB. With the evolution of communication technologies, the name "access network device" may change. For the convenience of description, in the embodiments of the present disclosure, the above-mentioned devices that provide the wireless communication functions for the terminal device(s) 10 are collectively referred to as an access network device. Optionally, a communication relationship may be established between the terminal device(s) 10 and the core network device(s) 30 through an access network device 20. Exemplarily, in a Long Term Evolution (LTE) system, the access network device 20 may be Evolved Universal Terrestrial Radio Access Network (EUTRAN) or one or more eNodeBs in EUTRAN. In the 5G NR system, the access network device 20 may be a Radio Access Network (RAN) or one or more gNBs in the RAN. In embodiments of the present disclosure, the network device refers to the access network device 20 (e.g., base station) unless otherwise specified.

The core network device 30 is a device deployed in a core network. The functions of the core network device 30 are mainly to provide user connections, manage users, and carry services, and provide an interface to an external network as a bearer network. For example, the core network device in the 5G NR system may include an Access and Mobility Management Function (AMF) entity, a User Plane Function (UPF) entity and a Session Management Function (SMF) entity and other device.

In an example, the access network device(s) 20 and the core network device(s) 30 communicate with each other through a certain air interface technology, such as an NG interface in a 5G NR system. The access network device(s) 20 and the terminal device(s) 10 communicate with each other through a certain air interface technology, such as a Uu interface.

The "5G NR system" in the embodiments of the present disclosure may also be called a 5G system or an NR system, but those skilled in the art can understand its meaning. The technical solutions described in the embodiments of the present disclosure may be applied to the LTE system, or may also be applied to the 5G NR system, or may also be applied to a subsequent evolved system of the 5G NR system, or may also be applied to other communication systems such as Narrow Band Internet of Things (NB-IoT), and embodiments of the present disclosure do not impose specific limitations on this.

Before introducing the technical solutions of the present disclosure, some background technical knowledge involved in the present disclosure will be introduced.

1) PUCCH Format

NR Rel-15 defines five formats for Physical Uplink Control Channel (PUCCH), which are PUCCH format 0~PUCCH format 4.

PUCCH format 0 and PUCCH format 2 are short PUCCHs, occupying 1 symbol or 2 symbols; PUCCH format 1, PUCCH format 3 and PUCCH format 4 are long PUCCHs, occupying 4 symbols or more.

PUCCH format 0 and PUCCH format 1 are used to transmit 1~2-bit Hybrid Automatic Repeat Request-Acknowledgment (HARQ-ACK) and/or Scheduling Request (SR); PUCCH format 2, PUCCH Format 3 and PUCCH format 4 are used to transmit Uplink Control Information (UCI) of more than 2 bits.

2) HARQ-ACK Transmission

When a terminal device uses PUCCH format 2 or PUCCH format 3 to transmit HARQ-ACK with $O_{ACK}$ bits and Cyclical Redundancy Check (CRC) with $O_{CRC}$ bits, a network device uses Radio Resource Control (RRC) signaling to configure a PUCCH resource to include $$M_{RB}^{PUCCH}$$

Physical Resource Blocks (PRBs). The terminal device determines a first minimum PRB $$\left(M_{RB,min}^{PUCCH}\right)$$

for PUCCH transmission. The first minimum PRB needs to meet the following conditions:

1) The first minimum PRB is less than or equal to $$M_{RB}^{PUCCH}.$$

2)

$$(O_{ACK} + O_{CRC}) \le M_{RB,min}^{PUCCH} \cdot N_{sc,ctrl}^{RB} \cdot N_{symb-UCI}^{PUCCH} \cdot Q_m \cdot r, \text{ and,}$$
$$(O_{ACK} + O_{CRC}) > \left(M_{RB,min}^{PUCCH} - 1\right) \cdot N_{sc,ctrl}^{RB} \cdot N_{symb-UCI}^{PUCCH} \cdot Q_m \cdot r.$$

If $$(O_{ACK} + O_{CRC}) > \left(M_{RB}^{PUCCH} - 1\right) \cdot N_{sc,ctrl}^{RB} \cdot N_{symb-UCI}^{PUCCH} \cdot Q_m \cdot r,$$

the terminal device transmits the PUCCH carrying the HARQ-ACK information on $$M_{RB}^{PUCCH}$$

PRBs.

Next, the parameters in the above formulas are explained:

r is the code rate (coding rate) configured by the parameter maxCodeRate in PUCCH-Config.

$Q_m$ is a modulation order.

$$M_{symb-UCI}^{PUCCH}$$

is the number of symbols available for UCI transmission in the PUCCH resource.

Specifically, for PUCCH format 2, $$M_{symb-UCI}^{PUCCH}$$

is equal to the number of symbols configured by a parameter nrofSymbols in PUCCH-Config. For PUCCH format 3 and PUCCH format 4, $$M_{symb-UCI}^{PUCCH}$$

is equal to the number of symbols configured by the parameter nrofSymbols in PUCCH-Config after excluding the number of symbols used for Demodulation Reference Signal (DMRS) transmission.

$$N_{sc,ctrl}^{RB}$$

is the number of carriers that can be used for UCI transmission in one Resource Block (RB) in the PUCCH resource.

Specifically, for PUCCH format 2, when occ-Length is not configured, $$N_{sc,ctrl}^{RB}$$

is the number of carriers per RB minus 4; when occ-Length is configured, $$N_{sc,ctrl}^{RB} = \left(N_{sc}^{RB} - 4\right)/occ\text{-Length}, N_{sc}^{RB}$$

is the number of subcarriers included in each RB; for PUCCH format 3 and PUCCH format 4, if an orthogonal code with length $N_{SF}^{PUCCH}$ is configured, $N_{sc,ctrl}^{RB} = N_{sc}^{RB}/N_{SF}^{PUCCH}$;

otherwise, $N_{sc,ctrl}^{RB} = N_{sc}^{RB}, N_{sc}^{RB}$ is the number of subcarriers included in each RB.

3) Rate Matching

When UCI is transmitted using PUCCH, a terminal device performs rate matching after UCI bits generation, block segmentation, CRC attachment and channel coding. For PUCCH format 2, PUCCH format 3 and PUCCH format 4, the total rate matching output sequence length is $E_{tot}$. The determination of $E_{tot}$ is as shown in Table 1 below (see Table 6.3.1.4-1 in the standard for details):

TABLE 1

| PUCCH format | Modulation order | |
| | QPSK | $\pi/2$-BPSK |
| --- | --- | --- |
| PUCCH format 2 | $16 \cdot N_{symb,UCI}^{PUCCH,2} \cdot N_{PRB}^{PUCCH,2}/N_{SF}^{PUCCH,2}$ | N/A |
| PUCCH format 3 | $24 \cdot N_{symb,UCI}^{PUCCH,3} \cdot N_{PRB}^{PUCCH,3}/N_{SF}^{PUCCH,3}$ | $12 \cdot N_{symb,UCI}^{PUCCH,3} \cdot N_{PRB}^{PUCCH,3}/N_{SF}^{PUCCH,3}$ |
| PUCCH format 4 | $24 \cdot N_{symb,UCI}^{PUCCH,4}/N_{SF}^{PUCCH,4}$ | $12 \cdot N_{symb,UCI}^{PUCCH,4}/N_{SF}^{PUCCH,4}$ |

After rate matching of different UCI bit sequences, the determination of the corresponding rate matching output sequence length $E_{UCI}$ is shown in Table 2 below (taking UCI including HARQ-ACK, CSI part 1, and CSI part 2 as an example):

TABLE 2

| UCI(s) for transmission on a PUCCH | UCI for encoding | value of $E_{UCI}$ |
| --- | --- | --- |
| HARQ-ACK, CSI (CSI of two parts) | HARQ-ACK, CSI part 1 | $E_{UCI} = min\left(E_{tot}, \left[(O^{ACK} + O^{CSI-part1} + L)/R_{UCI}^{max}/Q_m\right] \cdot Q_m\right)$ |
| | CSI part 2 | $E_{UCI} = E_{tot} - min\left(E_{tot}, \left[(O^{ACK} + O^{CSI-part1} + L)/R_{UCI}^{max}/Q_m\right] \cdot Q_m\right)$ |

As shown in Table 2 above, that is, HARQ-ACK and CSI part 1 are coded together, and CSI part 2 is coded separately. When determining the output sequence length after rate matching, in principle, the rate matching output sequence length of HARQ-ACK and CSI part 1 is guaranteed preferentially, and the remaining rate matching sequence length is used to carry CSI part 2.

In NR R16, in order to better support URLLC services, high and low priorities are introduced in the physical layer for uplink channels, priority index 0 indicates low priority, and priority index 1 indicates high priority. In the NR R16 system, when uplink channels with different priorities overlap in the time domain, only the channel of high priority is transmitted, and the channel of low priority is dropped, that is, the transmission of the channel of high priority is guaranteed preferentially.

In R17, in order to reduce the impact of dropping uplink channel of low priority on system efficiency, multiplexing of overlapping channels with different priorities is supported. Specifically, R17 supports multiplexing HARQ-ACK of high priority (HP) and HARQ-ACK of low priority (LP) in the same PUCCH transmission. When the total number of bits of the HARQ-ACK of high priority and the HARQ-ACK of low priority is larger than 2, separate coding of the HARQ-ACK of high priority and the HARQ-ACK of low priority is supported. It can be understood that, in the embodiments of the present disclosure, the "high priority" in the HARQ-ACK of high priority refers to that the priority index of the channel with the HARQ-ACK is large, or the priority index of the HARQ-ACK is large. Correspondingly, the "low priority" in the HARQ-ACK of low priority refers to that the priority index of the channel with the HARQ-ACK is small, or the priority index of the HARQ-ACK is small.

In order to realize the multiplexing transmission of the HARQ-ACK of high priority and the HARQ-ACK of low priority, it is needed to determine respective rate matching output sequence lengths corresponding to the above two kinds of information. In the related art, there is no good way to determine the rate matching output sequence lengths of the HARQ-ACK of high priority and the HARQ-ACK of low priority.

In the embodiments of the present disclosure, an implementation of information multiplexing transmission is provided. Different information (for example, first information and second information) is supported to be transmitted on the same physical channel. In this case, based on a first bit length and/or a second bit length, a first rate matching output sequence length corresponding to the first information can be determined. Because the first bit length is determined according to the number of bits of the first information (such as HARQ-ACK of high priority) and a code rate corresponding to the first information, and the second bit length is determined according to the number of bits of the second information (such as HARQ-ACK of low priority) and the code rate corresponding to the second information, the determination of the first rate matching output sequence length takes into account the relevant parameter of the first information and/or the relevant parameter of the second information, which is beneficial to determine a reasonable first rate matching output sequence length, thereby ensuring the transmission of the first information.

In the following, the technical solutions of the present disclosure will be described through several embodiments.

FIG. 2 is a flowchart of an information processing method provided by an embodiment of the present disclosure. The method may be applied to the terminal device in the communication system shown in FIG. 1. The method may include the step as follows:

In step 202, based on a first bit length and/or a second bit length, a first rate matching output sequence length corresponding to first information is determined.

In an embodiment of the present disclosure, the first information and the second information are two pieces of information that are multiplexed and transmitted on a same physical channel. Optionally, the physical channel includes: PUCCH, and correspondingly, the first information and the second information are uplink control information transmitted on the PUCCH. Optionally, the types of the first information and the second information include: HARQ-ACK and/or CRC corresponding to the HARQ-ACK. It can be understood that the physical channel may also include other types of channels, and correspondingly, the first information and the second information may other types of information, which is not limited in the present disclosure. Exemplarily, the first information and the second information are two HARQ-ACKs multiplexed and transmitted on the PUCCH.

Optionally, a priority index of a channel with the first information is larger than a priority index of a channel with the second information. Optionally, a priority index of the first information is larger than a priority index of the second information. Exemplarily, the priority index of the channel with the first information is recorded as priority index 1, indicating a high priority, and the priority index of the channel with the second information is recorded as priority index 0, indicating a low priority.

Optionally, the first information and the second information are coded independently. That is, the first information corresponds to a code rate, and the second information corresponds to a code rate, and the above two code rates are separately configured and may be the same or different. Exemplarily, the code rate of the first information is denoted as $r_{HP}$, and the code rate of the second information is denoted as $r_{LP}$.

When the first information and the second information are multiplexed and transmitted on the physical channel, it is needed to perform rate matching on the information, and determine the rate matching output sequence length of the information. In an embodiment of the present disclosure, the first rate matching output sequence length corresponding to the first information is determined based on the first bit length and/or the second bit length.

As an example, the first rate matching output sequence length is determined based on the first bit length. As another example, the first rate matching output sequence length is determined based on the second bit length. As an example, the first rate matching output sequence length is determined based on the first bit length and the second bit length.

The first bit length is determined according to the number of bits of the first information and the code rate corresponding to the first information, the second bit length is determined according to the number of bits of the second information and the code rate corresponding to the second information, and the first information and the second information are transmitted on the same physical channel.

That is, the first bit length is a length determined based on a relevant parameter of the first information, and the second bit length is a length determined based on a relevant parameter of the second information. Since the first rate matching output sequence length corresponding to the first information is determined based on the first bit length and/or the second bit length, the determination of the first rate matching output sequence length depends on the relevant parameter of the first information and/or the relevant parameter of the second information.

To sum up, in the methods provided in the embodiments, an implementation of information multiplexing transmission is provided. Different information (for example, first information and second information) being transmitted on the same physical channel is supported. In this case, based on the first bit length and/or the second bit length, the first rate matching output sequence length corresponding to the first information can be determined. Since the first bit length is determined according to the number of bits of the first information and the code rate corresponding to the first information and the second bit length is determined according to the number of bits of the second information and the code rate corresponding to the second information, the determination of the first rate matching output sequence length takes into account the relevant parameter of the first information and/or the relevant parameter of the second information, which is conducive to determining a reasonable first rate matching output sequence length, thereby guaranteeing the transmission of the first information.

In an example embodiment, the determination of the first rate matching output sequence length is based on the following idea: in a case where the total rate matching output sequence length is larger than or equal to the sum of the first bit length and the second bit length, the first rate matching output sequence length is equal to the total rate matching output sequence length minus the second bit length.

As mentioned above in the section about rate matching, in R15, when HARQ-ACK and CSI (including CSI part 1 and CSI part 2) are multiplexed and transmitted on the same PUCCH, HARQ-ACK and CSI part 1 are coded together, and CSI part 2 is coded separately, and a total of two encoders are used. The output sequence length after rate matching of HARQ-ACK and CSI part 1 is: the minimum value of the total rate matching output sequence length and a rate matching output sequence length which is calculated according to the number of bits of HARQ-ACK and CSI part 1 and a corresponding modulation code. The output sequence length after the rate matching of CSI part 2 is: the total rate matching output sequence length minus the rate matching output sequence length of HARQ-ACK and CSI part 1. To some extent, this allocates the redundancy of a PUCCH resource to CSI part 2.

In an embodiment of the application, in a case where the total rate matching output sequence length is larger than or equal to the sum of the first bit length and the second bit length, the first rate matching output sequence length is equal to the total rate matching output sequence length minus the second bit length, and in a case that the priority of the first information is higher than that of the second information, this in effect allocates a redundant resource to the information of high priority, thereby ensuring the transmission of the information of high priority.

Next, exemplary descriptions will be given to methods that conform to the idea of determining the first rate matching output sequence length.

Method 1: The first rate matching output sequence length corresponding to the first information is the maximum value of the first bit length and a third bit length; or, the first rate matching output sequence length corresponding to the first information is equal to the third bit length; the third bit length is equal to the total rate matching output sequence length minus the second bit length, and the total rate matching output sequence length is a total rate matching output sequence length determined for information transmitted on the physical channel.

The total rate matching output sequence length is a total rate matching output sequence length determined for all information transmitted on the physical channel. In this embodiment of the present disclosure, it refers to the total rate matching output sequence length determined for the first information and the second information transmitted on the physical channel.

That is, the terminal device determines the first rate matching output sequence length corresponding to the first information based on the first bit length and the second bit length: calculating the third bit length by subtracting the calculated second bit length from the total rate matching output sequence length, and the first rate matching output sequence length corresponding to the first information is equal to the maximum value between the first bit length and the third bit length. Alternatively, the above process is simplified, without considering a case that the first bit length is larger than the third bit length, the first rate matching output sequence length corresponding to the first information is directly equal to the third bit length.

Optionally, the first bit length is equal to the minimum value of a first intermediate bit length and the total rate matching output sequence length, or the first bit length is equal to the first intermediate bit length; the first intermediate bit length is equal to a first rounded value multiplied by a modulation order corresponding to the first information, and the first rounded value is a value obtained by dividing the number of bits of the first information by the code rate corresponding to the first information and further performing dividing by the modulation order corresponding to the first information and then performing rounding.

That is, the terminal device calculates a first intermediate bit length based on the modulation order corresponding to the first information, the code rate corresponding to the first information, and the number of bits of the first information, and the first bit length is equal to the minimum value between the first intermediate bit length and the total rate matching output sequence length. Alternatively, the above process is simplified, without consider a case that the first intermediate bit length is larger than the total rate matching output sequence length, the first bit length is directly equal to the first intermediate bit length.

Optionally, the second bit length is equal to the minimum value of a second intermediate bit length and the total rate matching output sequence length, or the second bit length is equal to the second intermediate bit length; the second intermediate bit length is equal to a second rounded value multiplied by a modulation order corresponding to the second information, and the second rounded value is a value obtained by dividing the number of bits of the second information by the code rate corresponding to the second information and further performing dividing by the modulation order corresponding to the second information and then performing rounding.

That is, the terminal device calculates a second intermediate bit length based on the modulation order corresponding to the second information, the code rate corresponding to the second information, and the number of bits of the second information, and the second bit length is equal to the minimum value between the second intermediate bit length and the total rate matching output sequence length. Alternatively, the above process is simplified, without considering a case that the second intermediate bit length is larger than the total rate matching output sequence length, the second bit length is directly equal to the second intermediate bit length.

Optionally, the second rate matching output sequence length corresponding to the second information is determined in the following manner: determining that the second rate matching output sequence length corresponding to the second information is the total rate matching output sequence length corresponding to the first information; or, determining that the second rate matching output sequence length corresponding to the second information is the second bit length.

That is, the second rate matching output sequence length is determined based on the result of the first rate matching output sequence length, and the second rate matching output sequence length is equal to the total rate matching output sequence length minus the first rate matching output sequence length. Alternatively, the above process may simplified, and it is considered that in the case of reasonable configuration at the network device side (for example, the total rate matching output sequence length is larger than the sum of the first bit length and the second bit length), the second bit length is equal to the total rate matching output sequence length minus the first rate matching output sequence length, and the second rate matching output sequence is directly equal to the second bit length.

In the following, the above-mentioned method 1 is exemplarily described in combination with the following formulas.

1) Determine the first bit length $\tilde{E}_{HP}$ and the second bit length $\tilde{E}_{LP}$.

First bit length $\tilde{E}_{HP}$:

$$\tilde{E}_{HP}=\min(E_{tot},[(O_{HP\text{-}ACK}+O_{HP\text{-}CRC})/r_{HP}/Q_m]\times Q_m); \text{ or,}$$

$$\tilde{E}_{HP}=[(O_{HP\text{-}ACK}+O_{HP\text{-}CRC})/r_{HP}/Q_m]\times Q_m.$$

In the above formula, $E_{tot}$ it is the total rate matching output sequence length; $O_{HP\text{-}ACK}$ is the number of bits of the HARQ-ACK of high priority; $O_{HP\text{-}CRC}$ is the number of bits of CRC corresponding to the HARQ-ACK of high priority; the sum of $O_{HP\text{-}ACK}$ and $O_{HP\text{-}CRC}$ can be considered as the number of bits of the first information; $r_{HP}$ is the code rate corresponding to the first information; $Q_m$ is the modulation order corresponding to the first information.

It can be understood that, in the above formula $[(O_{HP\text{-}ACK}+O_{HP\text{-}CRC})/r_{HP}/Q_m]\times Q_m$ is the first intermediate bit length.

Second bit length $\tilde{E}_{LP}$:

$$\tilde{E}_{LP}=\min(E_{tot},[(O_{LP\text{-}ACK}+O_{LP\text{-}CRC})/r_{LP}/Q_m]\times Q_m); \text{ or,}$$

$$\tilde{E}_{LP}=[(O_{LP\text{-}ACK}+O_{LP\text{-}CRC})/r_{LP}/Q_m]\times Q_m.$$

In the above formula, $E_{tot}$ is the total rate matching output sequence length; $O_{LP\text{-}ACK}$ is the number of bits of the HARQ-ACK of low priority; $O_{LP\text{-}CRC}$ is the number of bits of CRC corresponding to the HARQ-ACK of low priority; the sum of $O_{LP\text{-}ACK}$ and $O_{LP\text{-}CRC}$ can be considered as the number of bits of the second information; $r_{HP}$ is the code rate corresponding to the second information; $Q_m$ is the modulation order corresponding to the second information.

It can be understood that in the above formula, $[(O_{LP\text{-}ACK}+O_{LP\text{-}CRC})/r_{LP}/Q_m]\times Q_m$ is the second intermediate bit length.

2) Determine the first rate matching output sequence length $E_{HP\text{-}}$.

The first rate matching output sequence length $E_{HP\text{-}AC}$:

$$E_{HP\text{-}ACK}=\max(\tilde{E}_{HP},E_{tot}-\tilde{E}_{LP}); \text{ or,}$$

$$E_{HP\text{-}ACK}=E_{tot}-\tilde{E}_{LP}.$$

In the above formula, $E_{tot}-\tilde{E}_{LP}$ is the third bit length.

3) Determine the second rate matching output sequence length $E_{LP\text{-}AC}$.

The second rate matches the output sequence length $E_{LP\text{-}ACK}$:

$$E_{LP\text{-}ACK}=E_{tot}-E_{HP\text{-}ACK}; \text{ or,}$$

$$E_{HP\text{-}ACK}=\tilde{E}_{LP}.$$

Method 2: the first rate matching output sequence length corresponding to the first information is the minimum value of the total rate matching output sequence length and a fourth bit length; or, the first rate matching output sequence length corresponding to the first information is equal to the fourth bit length; the fourth bit length is determined according to the first bit length and/or the second bit length, and the total rate matching output sequence length is the total rate matching output sequence length determined for information transmitted on the physical channel.

That is, the terminal device determines the first rate matching output sequence length corresponding to the first information based on the first bit length and/or the second bit length: the terminal device calculates the fourth bit length based on the first bit length and/or the second bit length, and the first rate matching output sequence length corresponding to the first information is equal to the minimum value of the total rate matching output sequence length and the fourth bit length. Alternatively, the above process is simplified, without considering a case that the fourth bit length is larger than the total rate matching output sequence length, the first rate matching output sequence length corresponding to the first information is directly equal to the fourth bit length.

Optionally, the fourth bit length is the maximum value of the first bit length and a fifth bit length, or the fourth bit length is equal to the fifth bit length; the fifth bit length is equal to the total rate matching output sequence length minus the second bit length.

That is, the fourth bit length is the maximum value of the first bit length and a value obtained by subtracting the second bit length from the total rate matching output sequence length; or, to simplify the above process, without considering a case that the first bit length is larger than the value obtained by subtracting the second bit length from the total rate matching output sequence length, the fourth bit length is directly equal to the value obtained by subtracting the second bit length from the total rate matching output sequence length.

Optionally, the first bit length is equal to the minimum value of the first intermediate bit length and the total rate matching output sequence length; or, the first bit length is equal to the first intermediate bit length; the first intermediate bit length is equal to the first rounded value multiplied by the modulation order corresponding to the first information, and the first rounded value is a value obtained by dividing the number of bits of the first information by the code rate corresponding to the first information and further performing dividing by the modulation order corresponding to the first information and then performing rounding.

That is, the terminal device calculates a first intermediate bit length based on the modulation order corresponding to the first information, the code rate corresponding to the first information, and the number of bits of the first information, and the first bit length is equal to the minimum value of the first intermediate bit length and the total rate matching output sequence length; or, to simplify the above process, without considering the case that the first intermediate bit length is larger than the total rate matching output sequence length, the first bit length is directly equal to the first intermediate bit length.

Optionally, the second bit length is equal to the minimum value of the second intermediate bit length and the total rate matching output sequence length; or, the second bit length is equal to the second intermediate bit length; the second intermediate bit length is equal to a second rounded value multiplied by the modulation order corresponding to the second information, and the second rounded value is a value obtained by dividing the number of bits of the second information by the code rate corresponding to the second information and then performing dividing by the modulation order corresponding, to the second information and performing rounding.

That is, the terminal device calculates a second intermediate bit length based on the modulation order corresponding to the second information, the code rate corresponding to the second information, and the number of bits of the second information, and the second bit length is equal to the minimum value of the second intermediate bit length and the total rate matching output sequence length; or, to simplify the above process, without considering the case that the second intermediate bit length is larger than the total rate matching output sequence length, the second bit length is directly equal to the second intermediate bit length.

Optionally, the second rate matching output sequence length corresponding to the second information is determined in the following manner: determining that the second rate matching output sequence length corresponding to the second information is the total rate matching output sequence length minus the first rate matching output sequence length corresponding to the first information; or, determining that the second rate matching output sequence length corresponding to the second information is the second bit length.

That is, the second rate matching output sequence length is determined based on the result of the first rate matching output sequence length, and the second rate matching output sequence length is equal to the total rate matching output sequence length minus the first rate matching output sequence length; or, the above process is simplified, and it is considered that in the case of reasonable configuration on the network device side (such as the total rate matching output sequence length is larger than the sum of the first bit length and the second bit length), the second bit length is equal to the total rate matching output sequence length minus the first rate matching output sequence length, and the second rate matching output sequence length is directly equal to the second bit length.

In the following, the above-mentioned method 2 is exemplarily described in combination with the following formula.

1) Determine the first bit length $\tilde{E}_{HP}$ and the second bit length $\tilde{E}_{LP}$.

First bit length $\tilde{E}_{HP}$:

$$\tilde{E}_{HP}=\min(E_{tot},[(O_{HP\text{-}ACK}+O_{HP\text{-}CRC})/r_{HP}/Q_m]\times Q_m);$$
$$\text{or,}$$

$$\tilde{E}_{HP}=[(O_{HP\text{-}ACK}+O_{HP\text{-}CRC})/r_{HP}/Q_m]\times Q_m.$$

In the above formula, $E_{tot}$ is the total rate matching output sequence length; $O_{HP\text{-}AC}$ is the number of bits of the HARQ-ACK of high priority; $O_{HP\text{-}C}$ is the number of bits of CRC corresponding to the HARQ-ACK of high priority; the sum of $O_{HP}$ and $O_{HP\text{-}CRC}$ can be considered as the number of bits of the first information; $r_{HP}$ is the code rate corresponding to the first information; $Q_m$ is the modulation order corresponding to the first information.

It can be understood that, in the above formula, $[(O_{HP\text{-}ACK}+O_{HP\text{-}CRC})/r_{HP}/Q_m]\times Q_m$ is the first intermediate bit length.

Second bit length $\tilde{E}_{LP}$:

$$\tilde{E}_{LP}=\min(E_{tot},[(O_{LP\text{-}ACK}+O_{LP\text{-}CRC})/r_{LP}/Q_m]\times Q_m);\text{ or,}$$

$$\tilde{E}_{LP}=[(O_{LP\text{-}ACK}+O_{LP\text{-}CRC})/r_{LP}/Q_m]\times Q_m.$$

In the above formula, $E_{tot}$ is the total rate matching output sequence length; $O_{LP\text{-}ACK}$ the number of bits of the HARQ-ACK of low priority; $O_{LP-CRC}$ is the number of bits of CRC corresponding to the HARQ-ACK of low priority; the sum of $O_{LP-ACK}$ and $O_{LP-CRC}$ can be considered as the number of bits of the second information; $r_{LP}$ is the code rate corresponding to the second information; $Q_m$ is the modulation order corresponding to the second information.

It can be understood that, in the above formula, $[(O_{LP-ACK}+O_{LP-CRC})/r_{LP}/Q_m]\times Q_m$ is the second intermediate bit length.

2) Determine the first rate matching output sequence length $E_{HP-ACK}$.

First rate matching output sequence length $E_{HP-ACK}$:

$$E_{HP-ACK}=\min(E_{tot},A);\text{ or,}$$

$$E_{HP-ACK}=A.$$

In the above formula, $E_{tot}$ is the total rate matching output sequence length; A is a value related to the first bit length $\tilde{E}_{HP}$ and/or the second bit length $\tilde{E}_{LP}$, and A is the fourth bit length.

Exemplarily, $A=\max(\tilde{E}_{HP},E_{tot}-\tilde{E}_{LP})$; or $A=E_{tot}-\tilde{E}_{LP}$.

3) Determine the second rate matching output sequence length $E_{LP-ACK}$.

The second rate matching output sequence length $E_{LP-ACK}$:

$$E_{LP-ACK}=E_{tot}-E_{HP-ACK};\text{ or,}$$

$$E_{LP-ACK}=\tilde{E}_{LP}.$$

In the embodiments of the present disclosure, based on the above method 1 or method 2, in the case of resource redundancy, redundant resource(s) can be allocated to first information of high priority, thereby ensuring the transmission of first information of high priority.

In the following, for the case where there is physical channel resource redundancy, based on the method 1 described in the embodiments of the present disclosure, the manner of determining the first rate matching output sequence length and the second rate matching output sequence length will be exemplarily described.

The terminal device determines that the total rate matching output sequence length after rate matching of the HARQ-ACK of high priority and the HARQ-ACK of low priority is 480, and the terminal device transmits, on the resource of PUCCH format 3, 18-bit HARQ-ACK of high priority, 6-bit CRC corresponding to HARQ-ACK of high priority, 20-bit HARQ-ACK of low priority, 11-bit CRC corresponding to HARQ-ACK of low priority, the modulation order is 2, and there are 5 symbols on the PUCCH resource can be used for UCI transmission. The number of carriers that can be used for UCI transmission in one RB is 12. HARQ-ACK of high-priority and HARQ-ACK of low priority are coded separately. The code rate of HARQ-ACK of high priority is 0.08, and the code rate of HARQ-ACK of low priority is 0.25.

Then, the first sequence length $\tilde{E}_{HP}$ and the second sequence length $\tilde{E}_{LP}$ are respectively:

$$\tilde{E}_{HP}=\min(E_{tot},[(O_{HP-ACK}+O_{HP-CRC})/r_{HP}/Q_m]\times Q_m)$$
$$=\min(480,[(18+6)/0.08/2]\times 2)=\min(480,300)=300$$

$$\tilde{E}_{LP}=\min(E_{tot},[(O_{LP-ACK}+O_{LP-CRC})/r_{LP}/Q_m]\times Q_m)$$
$$=\min(360,[(20+11)/0.25/2]\times 2)=\min(360,124)=124$$

16

Therefore, the PUCCH resource has 480−300−124=56 REs redundant in the Resource Element (RE) dimension.

If the HARQ-ACK of high priority directly multiplexes the encoder of HARQ-ACK+CSI part 1 in R15, the first rate matching output sequence length will be 300, and the HARQ-ACK of low priority directly multiplexes the encoder of CSI part 1, its second rate matching output sequence will be 480−300=180, that is, the 56 redundant REs are given to the HARQ-ACK of low priority.

According to this method, the first rate matching output sequence length corresponding to the HARQ-ACK of high priority is: $E_{HP-ACK}=\max(\tilde{E}_{HP},E_{tot}-\tilde{E}_{LP})=\max(300,480-124)=356$. The second rate matching output sequence length corresponding to the HARQ-ACK of low priority is: $E_{LP-ACK}=E_{tot}-\max(\tilde{E}_{HP},E_{tot}-\tilde{E}_{LP})=480-356=124$.

According to this method, the 56 redundant REs are allocated to the HARQ-ACK of high priority, so as to ensure the reliability of the transmission of HARQ-ACK of high priority as much as possible.

In the following, for the case where there is no physical channel resource redundancy, based on the method 1 described in the embodiments of the present disclosure, the manner of determining the first rate matching output sequence length and the second rate matching output sequence length will be exemplarily described.

The terminal determines that the total rate matching output sequence length after rate matching of HARQ-ACK of high priority and HARQ-ACK of low priority is 360, and the terminal device transmits, on the resource of PUCCH format 3, 18-bit HARQ-ACK of high priority, 6-bit CRC corresponding to HARQ-ACK of high priority, 20-bit HARQ-ACK of low priority, 11-bit CRC corresponding to HARQ-ACK of low priority, the modulation order is 2, and there are 5 symbols on the PUCCH resource can be used for UCI transmission. The number of carriers that can be used for UCI transmission in one RB is 12. HARQ-ACK of high priority and HARQ-ACK of low priority are coded separately. The code rate of HARQ-ACK of high priority is 0.08, and the code rate of HARQ-ACK of low priority is 0.25.

Then, the first sequence length $\tilde{E}_{HP}$ and the second sequence length $\tilde{E}_{LP}$ are respectively:

$$\tilde{E}_{HP}=\min(E_{tot},[(O_{HP-ACK}+O_{HP-CRC})/r_{HP}/Q_m]\times Q_m)$$
$$=\min(360,([18+6)/0.08/2]\times 2))=\min(360,300)=300$$

$$\tilde{E}_{LP}=\min(E_{tot},[(O_{LP-ACK}+O_{LP-CRC})/r_{LP}/Q_m]\times Q_m)$$
$$=\min(360,([20+11)/0.25/2]\times 2))=\min(360,124)=124$$

Since 300+124 is larger than 360, in this configuration, there is no PUCCH resource redundancy, and it is needed to prioritize the transmission of HARQ-ACK of high priority. According to this method, the first rate matching output sequence length corresponding to HARQ-ACK of high priority is: $E_{HP-ACK}=\max(\tilde{E}_{HP},E_{tot}-\tilde{E}_{LP})=\max(300,300-124)=300$, and the second rate matching output sequence length corresponding to HARQ-ACK of low priority is: $E_{LP-ACK}=E_{tot}-\max(\tilde{E}_{HP},E_{tot}-\tilde{E}_{LP})=360-300=60$. That is, when there is no redundancy in PUCCH resource, this solution can give priority to ensuring the reliability of transmission of HARQ-ACK of high priority.

In an example embodiment, the terminal device first needs to determine the total rate matching output sequence length, and then determine the values of the first rate matching output sequence length and the second rate matching output sequence length according to the total rate matching output sequence length.

FIG. 3 shows a flowchart of an information processing method provided by an embodiment of the present disclosure. The method may be applied to terminal device in the communication system shown in FIG. 1. The method may include the following steps (step 302 to step 306):

In step 302, the number of PRBs for the physical channel is determined.

In a possible implementation, the terminal device determines the number of PRBs for the physical channel according to a first value and a second value; where the first value is equal to the number of bits of the first information divided by the code corresponding to the first information; the second value is equal to the number of bits of the second information divided by the code rate corresponding to the second information; the first information includes: HARQ-ACK of high priority and/or CRC corresponding to HARQ-ACK of high priority; the second information includes: the HARQ-ACK of low priority and/or the CRC corresponding to the HARQ-ACK of low priority.

Exemplarily, the first value:

$$\frac{O_{HP-ACK} + O_{HP-CRC}}{r_{HP}};$$

the second value:

$$\frac{O_{LP-ACK} + O_{LP-CRC}}{r_{LP}}.$$

It can be understood that in this embodiment of the present disclosure, the first value being equal to the number of bits of the first information divided by the code rate corresponding to the first information and the second value being equal to the number of bits of the second information divided by the code rate corresponding to the second information is taken as an example for illustration, the first value may be a value determined according to the number of bits of the first information and the code rate corresponding to the first information, and the second value may be a value determined according to the number of bits of the second information and the code rate corresponding to the second information, that is, the first value and the second value may be in other modified forms different from the above example, which is not limited in the present disclosure.

In the above formula, $O_{HP-ACK}$ is the number of bits of the HARQ-ACK of high priority, $O_{HP-CRC}$ is the number of bits of the CRC corresponding to the HARQ-ACK of high priority, the sum of $O_{HP-ACK}$ and $O_{HP-CRC}$ can be considered as the number of bits of the first information; $r_{HP}$ is the code rate corresponding to the first information; $O_{LP-ACK}$ is the number of bits of the HARQ-ACK of low priority, $O_{LP-CRC}$ is the number of bits of the CRC corresponding to the HARQ-ACK of low priority, the sum of $O_{LP-ACK}$ and $O_{LP-CRC}$ can be considered as the number of bits of the second information; $r_{LP}$ is the code rate corresponding to the second information.

Further, the manner in which the terminal device determines the number of PRBs for the physical channel according to the first value and the second value is as follows:

If $$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB}^{PUCCH} - 1\right) \times N_{sc,ctrl}^{RB} \times M_{symb-UCI}^{PUCCH} \times Q_m,$$

the terminal device uses $$M_{RB}^{PUCCH}$$

PRBs to transmit the physical channel, where $$M_{RB}^{PUCCH}$$

is the number of PRBs configured by the network device for the physical channel.

If the condition of $$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB}^{PUCCH} - 1\right) \times N_{sc,ctrl}^{RB} \times M_{symb-UCI}^{PUCCH} \times Q_m$$

is not satisfied, the terminal device determines a $$M_{RB,min}^{PUCCH},$$

and based on $$M_{RB,min}^{PUCCH},$$

the number of PRBs for transmitting the physical channel is determined, such as: using $$M_{RB,min}^{PUCCH}$$

PRBs to transmit the physical channel, or using another number of PRBs determined based on $$M_{RB,min}^{PUCCH}$$

to transmit the physical channel. For example: for PUCCH format 3, if $$M_{RB,min}^{PUCCH}$$

is not equal to $2^{\circ 2} \cdot 3^{\circ 3} \cdot 5^{\circ 5}$ defined in [4, TS 38.211], $$M_{RB,min}^{PUCCH}$$

is increased to a value closest to the parameter nrofPRB for PUCCH format 3 defined in [12, TS 38.331].

$$M_{RB,min}^{PUCCH}$$

needs to be meet the following conditions:
1)

$$M_{RB,min}^{PUCCH}$$

is less than or equal to $$M_{RB}^{PUCCH};$$

$$\left( \frac{O_{HP-ACK} + O_{HP-CRC}}{r_{HP}} + \frac{O_{LP-ACK} + O_{LP-CRC}}{r_{LP}} \right) \leq \quad (2)$$

$$M_{RB,min}^{PUCCH} \times N_{sc,ctrl}^{RB} \times M_{symb-UCI}^{PUCCH} \times Q_m; \text{ and,}$$

$$\left( \frac{O_{HP-ACK} + O_{HP-CRC}}{r_{HP}} + \frac{O_{LP-ACK} + O_{LP-CRC}}{r_{LP}} \right) >$$

$$\left( M_{RB,min}^{PUCCH} - 1 \right) \times N_{sc,ctrl}^{RB} \times M_{symb-UCI}^{PUCCH} \times Q_m.$$

In the above formulas, $Q_m$ is the modulation order;

$$M_{symb-UCI}^{PUCCH}$$

is the number of symbols that can be used for UCI transmission in the PUCCH resource;

$$N_{sc,ctrl}^{RB}$$

is the number of carriers that can be used for UCI transmission in one RB in the PUCCH resource.

Exemplarily, the terminal device transmits, on the resource of PUCCH format 3, 18-bit HARQ-ACK of high priority, 6-bit CRC corresponding to HARQ-ACK of high priority, 20-bit HARQ-ACK of low priority, and 11-bit CRC corresponding to HARQ-ACK of low priority, the modulation order is 2, and there are 5 symbols on the PUCCH resource that can be used for UCI transmission, and the number of carriers that can be used for UCI transmission in one RB is 12. The HARQ-ACK of high priority and HARQ-ACK of low priority are coded separately, the code rate of HARQ-ACK of high priority is 0.08, and the code rate of HARQ-ACK of low priority is 0.25.

If the number of PRBs configured on the PUCCH resource is 3, $$\left( \frac{18 + 6}{0.08} + \frac{20 + 11}{0.25} \right) > (3 - 1) \times 12 \times 5 \times 2,$$

and thus the terminal device uses 3 PRBs to transmit the PUCCH.

If the number of PRBs configured on the PUCCH resource is 10, $$\left( \frac{18 + 6}{0.08} + \frac{20 + 11}{0.25} \right) \leq (10 - 1) \times 12 \times 5 \times 2,$$

and thus the terminal device can determine $$M_{RB,min}^{PUCCH}$$

to be 4, which can meet the requirement that 4 is less than or equal to 10, and, $$\left( \frac{18 + 6}{0.08} + \frac{20 + 11}{0.25} \right) \leq 4 \times 12 \times 5 \times 2,$$

$$\left( \frac{18 + 6}{0.08} + \frac{20 + 11}{0.25} \right) > (4 - 1) \times 12 \times 5 \times 2,$$

and thus the terminal device uses 4 PRBs to transmit PUCCH.

In step 304, based on the number of PRBs, the total rate matching output sequence length is determined.

For different physical channel formats, the corresponding formulas for determining the total rate matching output sequence length based on the number of PRBs are different. For details, refer to Table 1 above, and details are not described here.

In step 306, based on the first bit length and/or the second bit length, the first rate matching output sequence length corresponding to the first information is determined.

For the specific implementation manner of step 306, refer to the foregoing embodiments, and details are not repeated here.

To sum up, in the technical solutions provided by the embodiments, two pieces of information which are multiplexed and transmitted are coded separately, and a reasonable total rate matching output sequence length is determined based on the relevant parameters of the two pieces of information and the relevant configuration of the network device side.

Meanwhile, in the technical solutions provided by the embodiments, the basic idea of determining the total rate matching output sequence length refers to the basic idea of the total rate matching output sequence length specified in the existing communication protocol, which is conducive to reducing the workload of the standardization of communication protocol.

It can be understood that the above method embodiments may be implemented individually or in combination, which is not limited in the present disclosure.

The following are device embodiments of the present disclosure, which can be used to implement the method embodiments of the present disclosure. For details not disclosed in the device embodiments of the present disclosure, please refer to the method embodiments of the present disclosure.

FIG. 4 shows a block diagram of an information processing apparatus provided by an embodiment of the present disclosure. The apparatus has the function of implementing the above example methods on the terminal device side. The function may be implemented by hardware, or may be implemented by executing corresponding software by the hardware. The apparatus may be the terminal device described above, or may be set in the terminal device. As shown in FIG. 4, the apparatus 400 may include: a first sequence length determination module 402.

The first sequence length determination module 402 is configured to, based on a first bit length and/or a second bit length, determine a first rate matching output sequence length corresponding to first information;

wherein the first bit length is determined according to the number of bits of the first information and a code rate corresponding to the first information, and the second bit length is determined according to the number of bits of second information and a code rate corresponding to the second information, and the first information and the second information are transmitted on the same physical channel.

In an optional embodiment, the first rate matching output sequence length corresponding to the first information is the maximum value of the first bit length and a third bit length;

or, the first rate matching output sequence length corresponding to the first information is equal to the third bit length;

wherein the third bit length is equal to a total rate matching output sequence length minus the second bit length, and the total rate matching output sequence length is a total rate matching output sequence length determined for information transmitted on the physical channel.

In an optional embodiment, the first rate matching output sequence length corresponding to the first information is the minimum value of a total rate matching output sequence length and a fourth bit length;

or, the first rate matching output sequence length corresponding to the first information is equal to the fourth bit length;

wherein the fourth bit length is determined according to the first bit length and/or the second bit length, and the total rate matching output sequence length is a total rate matching output sequence length determined for information transmitted on the physical channel.

In an optional embodiment, the fourth bit length is the maximum value of the first bit length and a fifth bit length, or the fourth bit length is equal to the fifth bit length;

wherein the fifth bit length is equal to the total rate matching output sequence length minus the second bit length.

In an optional embodiment, the first bit length is equal to the minimum value of a first intermediate bit length and the total rate matching output sequence length, or the first bit length is equal to the first intermediate bit length;

wherein the first intermediate bit length is equal to a first rounded value multiplied by a modulation order corresponding to the first information, and the first rounded value is a value obtained by dividing the number of bits of the first information by the code rate corresponding to the first information and further performing dividing by the modulation order corresponding to the first information and then performing rounding.

In an optional embodiment, the second bit length is equal to the minimum value of a second intermediate bit length and the total rate matching output sequence length, or the second bit length is equal to the second intermediate bit length;

wherein the second intermediate bit length is equal to a second rounded value multiplied by a modulation order corresponding to the second information, and the second rounded value is a value obtained by dividing the number of bits of the second information by the code rate corresponding to the second information and further performing dividing by the modulation order corresponding to the second information and then performing rounding.

In an optional embodiment, the apparatus further includes a second sequence length determination module;

wherein the second sequence length determination module is configured to determine that a second rate matching output sequence length corresponding to the second information is a total rate matching output sequence length minus the first rate matching output sequence length corresponding to the first information;

or, wherein the second sequence length determination module is configured to determine that the second rate matching output sequence length corresponding to the second information is the second bit length;

wherein the total rate matching output sequence length is a total rate matching output sequence length determined for information transmitted on the physical channel.

In an optional embodiment, the apparatus further includes a physical resource block number determination module and a third sequence length determination module:

wherein the physical resource block number determination module is configured to determine the number of PRBs for the physical channel; and wherein the third sequence length determination module is configured to, based on the number of PRBs, determine a total rate matching output sequence length.

In an optional embodiment, the physical resource block number determination module is configured to:

determine the number of PRBs for the physical channel according to a first value and a second value;

wherein:

the first value is equal to the number of bits of the first information divided by the code rate corresponding to the first information;

the second value is equal to the number of bits of the second information divided by the code rate corresponding to the second information;

the first information includes: a HARQ-ACK and/or a CRC corresponding to the HARQ-ACK of high priority;

the second information includes: a HARQ-ACK of low priority and/or CRC corresponding to the HARQ-ACK of low priority.

In an optional embodiment, the code rate of the first information and the code rate of the second information are separately configured.

In an optional embodiment, the physical channel includes PUCCH.

In an optional embodiment, a priority index of a channel with the first information is larger than a priority index of a channel with the second information.

It should be noted that when the apparatuses provided by the above embodiments realize their functions, the division of the above-mentioned functional modules is only used as an example for illustration. In practical applications, the above-mentioned function allocation can be completed by different functional modules according to actual needs. That is, the content structure of the apparatuses is divided into different functional modules to complete all or part of the functions described above.

Regarding the apparatuses in the foregoing embodiments, the specific manner in which each module executes operations has been described in detail in the embodiments related to the methods, and will not be described in detail here.

FIG. 5 shows a schematic structural diagram of a terminal device provided by an embodiment of the present disclosure. The terminal device may include: a processor 501, a receiver 502, a transmitter 503, a memory 504 and a bus 505.

The processor 501 includes one or more processing cores, and the processor 501 executes various functional applications and information processing by running software programs and modules.

The receiver 502 and the transmitter 53 may be implemented as a transceiver 506, which may be a communication chip.

The memory 504 is connected to the processor 501 through the bus 505.

The memory 504 may be used to store a computer program, and the processor 501 is used to execute the computer program, so as to implement various steps performed by the terminal device in the above method embodiments.

In addition, the memory 504 may be realized by any type of volatile or non-volatile storage device or their combination. The volatile or non-volatile storage device includes but not limited to: Random-Access Memory (RAM) and Read-Only Memory (ROM), Erasable Programmable Read-Only Memory (EPROM), Electrically Erasable Programmable Read-Only Memory (EEPROM), flash memory or other solid-state storage technology, Compact Disc Read-Only Memory (CD-ROM), Digital Video Disc (DVD, high-density digital video disc) or other optical storage, tape cartridge, tape, magnetic disk storage or other magnetic storage device.

Optionally, the processor 501 is configured to, based on a first bit length and/or a second bit length, determine a first rate matching output sequence length corresponding to first information;

wherein the first bit length is determined according to the number of bits of the first information and a code rate corresponding to the first information, and the second bit length is determined according to the number of bits of second information and a code rate corresponding to the second information, and the first information and the second information are transmitted on the same physical channel.

Optionally, the first rate matching output sequence length corresponding to the first information is the maximum value of the first bit length and a third bit length;

or, the first rate matching output sequence length corresponding to the first information is equal to the third bit length;

wherein the third bit length is equal to a total rate matching output sequence length minus the second bit length, and the total rate matching output sequence length is a total rate matching output sequence length determined for information transmitted on the physical channel.

Optionally, the first rate matching output sequence length corresponding to the first information is the minimum value of a total rate matching output sequence length and a fourth bit length;

or, the first rate matching output sequence length corresponding to the first information is equal to the fourth bit length;

wherein the fourth bit length is determined according to the first bit length and/or the second bit length, and the total rate matching output sequence length is a total rate matching output sequence length determined for information transmitted on the physical channel.

Optionally, the fourth bit length is the maximum value of the first bit length and a fifth bit length, or the fourth bit length is equal to the fifth bit length;

wherein the fifth bit length is equal to the total rate matching output sequence length minus the second bit length.

Optionally, the first bit length is equal to the minimum value of a first intermediate bit length and the total rate matching output sequence length, or the first bit length is equal to the first intermediate bit length;

wherein the first intermediate bit length is equal to a first rounded value multiplied by a modulation order corresponding to the first information, and the first rounded value is a value obtained by dividing the number of bits of the first information by the code rate corresponding to the first information and further performing dividing by the modulation order corresponding to the first information and then performing rounding.

Optionally, the second bit length is equal to the minimum value of a second intermediate bit length and the total rate matching output sequence length, or the second bit length is equal to the second intermediate bit length;

wherein the second intermediate bit length is equal to a second rounded value multiplied by a modulation order corresponding to the second information, and the second rounded value is a value obtained by dividing the number of bits of the second information by the code rate corresponding to the second information and further performing dividing by the modulation order corresponding to the second information and then performing rounding.

Optionally, the processor 501 is configured to determine that a second rate matching output sequence length corresponding to the second information is a total rate matching output sequence length minus the first rate matching output sequence length corresponding to the first information;

or, wherein the processor 501 is configured to determine that the second rate matching output sequence length corresponding to the second information is the second bit length;

wherein the total rate matching output sequence length is a total rate matching output sequence length determined for information transmitted on the physical channel.

Optionally, the processor 501 is configured to determine the number of PRBs for the physical channel; and based on the number of PRBs, determine a total rate matching output sequence length.

Optionally, the processor 501 is configured to determine the number of PRBs for the physical channel according to a first value and a second value;

wherein:

the first value is equal to the number of bits of the first information divided by the code rate corresponding to the first information;

the second value is equal to the number of bits of the second information divided by the code rate corresponding to the second information;

the first information includes: a HARQ-ACK and/or a CRC corresponding to the HARQ-ACK of high priority;

the second information includes: a HARQ-ACK of low priority and/or CRC corresponding to the HARQ-ACK of low priority.

Optionally, the code rate of the first information and the code rate of the second information are separately configured.

Optionally, the physical channel includes PUCCH.

Optionally, a priority index of a channel with the first information is larger than a priority index of a channel with the second information.

An embodiment of the present disclosure also provides a computer-readable storage medium, where a computer program is stored in the storage medium, and the computer program is used to be executed by the processor of the first terminal device, so as to implement the above-mentioned information processing method at the terminal device side.

Optionally, the computer-readable storage medium may include: Read-Only Memory (ROM), Random-Access Memory (RAM), Solid State Drives (SSD) or optical discs, etc. The random access memory may include Resistance Random Access Memory (ReRAM), and Dynamic Random Access Memory (DRAM).

An embodiment of the present disclosure further provides a chip. The chip includes a programmable logic circuit and/or program instructions, configured to implement the information processing method at the terminal device side when the chip is run on the terminal device.

An embodiment of the present disclosure further provides a computer program product or computer program. The computer program product or computer program includes computer instructions, the computer instructions are stored in a computer-readable storage medium, and the processor of the first terminal device reads the computer instructions from the computer-readable storage medium and executes the computer instructions, so as to implement the information processing methods at the terminal device side.

It should be understood that the "indication/indicate" mentioned in the embodiments of the present disclosure may be direct indication/indicate, may also be indirect indication/indicate, and may also mean that there is an association relationship. For example, A indicates B, which can mean that: A directly indicates B, for example, B can be obtained through A; it can also represent that A indirectly indicates B, for example, A indicates C and B can be obtained through C; it can also represent that there is an association relationship between A and B.

In the description of the embodiments of the present disclosure, the term "corresponding/correspond" may represent that there is a direct or indirect correspondence between two objects, or that there is an association relationship between the two objects, or that the two objects are in a indicating and being indicated relationship, or a configuring and being configured relationship.

The "plurality of" mentioned herein means two or more. The term "and/or" describes the association relationship of associated objects, indicating that there may be three types of relationships. For example, A and/or B may indicate: A alone, B alone, and A and B together. The character "/" generally indicates that the contextual objects on or before the character "/" are in an "or" relationship.

In addition, the numbering of the steps described herein only exemplarily shows a possible sequence of execution among the steps. In some other embodiments, the above-mentioned steps may not be executed according to the order of the numbers, such as two steps of different numbers are executed at the same time, or two steps with different numbers are executed in the reverse order as shown in the drawings, which is not limited in the embodiments of the present disclosure.

Those skilled in the art should be aware that, in the foregoing one or more examples, the functions described in the embodiments of the present disclosure may be implemented by hardware, software, firmware or any combination thereof. When implemented in software, the functions may be stored on a computer-readable medium and transmitted as one or more instructions or codes on the computer-readable medium. The computer-readable medium includes a computer storage medium and a communication medium which includes any medium that facilitates transfer of a computer program from one place to another. The storage medium may be any available medium that can be accessed by a general purpose or special purpose computer.

The above are only example embodiments of the present disclosure, and are not intended to limit the present disclosure. Any modifications, equivalent replacements, improvements, etc. made within the spirit and principles of the present disclosure should be included in the protection scope of the present disclosure.

What is claimed is:

1. An information processing method, comprising:

based on at least one of a first bit length or a second bit length, determining a first rate matching output sequence length corresponding to first information;

wherein the first bit length is determined according to a number of bits of the first information and a code rate corresponding to the first information, and the second bit length is determined according to a number of bits of second information and a code rate corresponding to the second information, and the first information and the second information are transmitted on a same physical channel;

wherein the method further comprises:

determining a number of Physical Resource Blocks (PRBs) for the physical channel; and based on the number of PRBs, determining a total rate matching output sequence length, wherein the total rate matching output sequence length is used for determining the first rate matching output sequence length corresponding to the first information;

wherein determining the number of PRBs for the physical channel comprises:

determining the number of PRBs for the physical channel according to a first value and a second value;

wherein:

the first value is equal to the number of bits of the first information divided by the code rate corresponding to the first information;

the second value is equal to the number of bits of the second information divided by the code rate corresponding to the second information;

the first information comprises at least one of: Hybrid Automatic Repeat Request-Acknowledgement (HARQ-ACK) of high priority or a Cyclic Redundancy Check (CRC) corresponding to the HARQ-ACK of high priority; and the second information comprises at least one of: HARQ-ACK of low priority or CRC corresponding to the HARQ-ACK of low priority.

2. The method according to claim 1, wherein the code rate of the first information and the code rate of the second information are separately configured.

3. The method according to claim 1, wherein the physical channel comprises Physical Uplink Control Channel (PUCCH).

4. The method according to claim 1, wherein a priority index of a channel with the first information is larger than a priority index of a channel with the second information.

5. The method according to claim 1, wherein determining of the number of PRBs for the physical channel according to the first value and the second value comprises:

if the following condition being satisfied:

$$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB}^{PUCCH} - 1\right) \times N_{sc,ctrl}^{RB} \times M_{symb-UCI}^{PUCCH} \times Q_m,$$

using, by a terminal device, $$M_{RB}^{PUCCH}$$

PRBs to transmit the physical channel, wherein:

$$M_{RB}^{PUCCH}$$

is the number of PRBs configured by a network device for the physical channel;

$O_{HP-ACK}$ is the number of bits of the HARQ-ACK of high priority;

$O_{HP-CRC}$ is the number of bits of the CRC corresponding to the HARQ-ACK of high priority, and a sum of $O_{HP-ACK}$ and $O_{HP-CRC}$ is considered as the number of bits of the first information;

$r_{HP}$ is the code rate corresponding to the first information;

$r_{LP}$ is the code rate corresponding to the second information;

$O_{LP-ACK}$ is the number of bits of the HARQ-ACK of low priority;

$O_{LP-CRC}$ is the number of bits of the CRC corresponding to the HARQ-ACK of low priority, and a sum of $O_{LP-ACK}$ and $O_{LP-CRC}$ is considered as the number of bits of the second information;

$Q_m$ is a modulation order;

$$M_{symb-UCI}^{PUCCH}$$

is the number of symbols that can be used for Uplink Control Information (UCI) transmission in a PUCCH resource; and $$N_{sc,ctrl}^{RB}$$

is the number of carriers that can be used for UCI transmission in one RB in a PUCCH resource.

6. The method according to claim 5, wherein determining of the number of PRBs for the physical channel according to the first value and the second value further comprises:

if the following condition being not satisfied:

$$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB}^{PUCCH} - 1\right) \times N_{sc,ctrl}^{RB} \times M_{symb-UCI}^{PUCCH} \times Q_m$$

determining, by the terminal device, a $$M_{RB,min}^{PUCCH},$$

and determining the number of PRBs for transmitting the physical channel based on $$M_{RB,min}^{PUCCH};$$

wherein $$M_{RB,min}^{PUCCH}$$

meets the following conditions:

$$M_{RB,min}^{PUCCH} \le M_{RB}^{PUCCH};$$
$$\left(\frac{O_{HP-ACK} + O_{HP-CRC}}{r_{HP}} + \frac{O_{LP-ACK} + O_{LP-CRC}}{r_{LP}}\right) \le$$
$$M_{RB,min}^{PUCCH} \times N_{sc,ctrl}^{RB} \times M_{symb-UCI}^{PUCCH} \times Q_m; \text{ and,}$$
$$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB,min}^{PUCCH} - 1\right) \times N_{sc,ctrl}^{RB} \times M_{symb-UCI}^{PUCCH} \times Q_m.$$

7. The method according to claim 6, wherein determining number of PRBs for transmitting the physical channel based on $$M_{RB,min}^{PUCCH}$$

comprises:

using $$M_{RB,min}^{PUCCH}$$

PRBs to transmit the physical channel; or
using another number of PRBs determined based on $$M_{RB,min}^{PUCCH}$$

to transmit the physical channel.

8. A terminal device, comprising:

a processor; and a memory storing instructions executable by the processor;

wherein when the instructions are executed by the processor, the terminal device is caused to:

based on at least one of a first bit length or a second bit length, determine a first rate matching output sequence length corresponding to first information;

wherein the first bit length is determined according to a number of bits of the first information and a code rate corresponding to the first information, and the second bit length is determined according to a number of bits of second information and a code rate corresponding to the second information, and the first information and the second information are transmitted on a same physical channel;

wherein when the instructions are executed by the processor, the terminal device is caused to:

determine a number of Physical Resource Blocks (PRBs) for the physical channel; and based on the number of PRBs, determine a total rate matching output sequence length, wherein the total rate matching output sequence length is used for determining the first rate matching output sequence length corresponding to the first information;

wherein when the instructions are executed by the processor, the terminal device is caused to:

determine the number of PRBs for the physical channel according to a first value and a second value;

wherein:

the first value is equal to the number of bits of the first information divided by the code rate corresponding to the first information;

the second value is equal to the number of bits of the second information divided by the code rate corresponding to the second information;

the first information comprises at least one of: a Hybrid Automatic Repeat Request-Acknowledgement (HARQ-ACK) of high priority or a Cyclic Redundancy Check (CRC) corresponding to the HARQ-ACK of high priority; and the second information comprises at least one of: a HARQ-ACK of low priority or CRC corresponding to the HARQ-ACK of low priority.

9. The terminal device according to claim 8, wherein the code rate of the first information and the code rate of the second information are separately configured.

10. The terminal device according to claim 8, wherein the physical channel comprises Physical Uplink Control Channel (PUCCH).

11. The terminal device according to claim 8, wherein a priority index of a channel with the first information is larger than a priority index of a channel with the second information.

12. The terminal device according to claim 8, wherein when the instructions are executed by the processor, the terminal device is caused to:

if the following condition being satisfied:

$$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB,min}^{PUCCH} - 1\right) \times N_{sc,ctrl}^{RB} \times M_{symb-UCI}^{PUCCH} \times Q_m, \text{ use } M_{RB}^{PUCCH}$$

PRBs to transmit the physical channel, wherein:

$$M_{RB}^{PUCCH}$$

is the number PRBs configured by a network device for the physical channel;

$O_{HP-ACK}$ is the number of bits of the HARQ-ACK of high priority;

$O_{HP-CRC}$ is the number of bits of the CRC corresponding to the HARQ-ACK of high priority, and a sum of $O_{HP-ACK}$ and $O_{HP-CRC}$ is considered as the number of bits of the first information;

$r_{HP}$ is the code rate corresponding to the first information;

$r_{LP}$ is the code rate corresponding to the second information;

$O_{LP-ACK}$ is the number of bits of the HARQ-ACK of low priority;

$O_{LP-CRC}$ is the number of bits of the CRC corresponding to the HARQ-ACK of low priority, and a sum of $O_{LP-ACK}$ and $O_{LP-CRC}$ is considered as the number of bits of the second information;

$Q_m$ is a modulation order;

$$M_{symb-UCI}^{PUCCH}$$

is the number of symbols that can be used for Uplink Control Information (UCI) transmission in a PUCCH resource;

$$N_{sc,ctrl}^{RB}$$

is the number of carriers that can be used for UCI transmission in one RB in a PUCCH resource.

13. The terminal device according to claim 12, wherein when the instructions are executed by the processor, the terminal device is caused to:

in response to the following condition being not satisfied:

$$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB,min}^{PUCCH} - 1\right) \times N_{sc,ctrl}^{RB} \times M_{symb-UCI}^{PUCCH} \times Q_m$$

determine a $$M_{RB,min}^{PUCCH},$$

and determine the number of PRBs for transmitting the physical channel based on $$M_{RB,min}^{PUCCH};$$

wherein $$M_{RB,min}^{PUCCH}$$

meets the following conditions:

$$M_{RB,min}^{PUCCH} \le M_{RB}^{PUCCH};$$

$$\left(\frac{O_{HP-ACK} + O_{HP-CRC}}{r_{HP}} + \frac{O_{LP-ACK} + O_{LP-CRC}}{r_{LP}}\right) \le$$
$$M_{RB,min}^{PUCCH} \times N_{sc,ctrl}^{RB} \times M_{symb-UCI}^{PUCCH} \times Q_m; \text{ and,}$$

$$\left(\frac{O_{HP-ACK} + O_{HP-CRC}}{r_{HP}} + \frac{O_{LP-ACK} + O_{LP-CRC}}{r_{LP}}\right) >$$
$$\left(M_{RB,min}^{PUCCH} - 1\right) \times N_{sc,ctrl}^{RB} \times M_{symb-UCI}^{PUCCH} \times Q_m.$$

14. The terminal device according to claim 13, wherein when the instructions are executed by the processor, the terminal device is caused to:
  use $$M_{RB,min}^{PUCCH}$$

PRBs to transmit the physical channel; or
  use another number of PRBs determined based on $$M_{RB,min}^{PUCCH}$$

to transmit the physical channel.

\* \* \* \* \*